United States Patent
Tabb et al.

(10) Patent No.: US 11,841,841 B2
(45) Date of Patent: *Dec. 12, 2023

(54) STAND IN TABLES

(71) Applicant: Google LLC, Mountain View, CA (US)

(72) Inventors: Lloyd Tabb, Santa Cruz, CA (US);
Michael Toy, Los Altos, CA (US);
Conrad Slimmer, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/062,303

(22) Filed: Dec. 6, 2022

(65) Prior Publication Data

US 2023/0098361 A1    Mar. 30, 2023

Related U.S. Application Data

(63) Continuation of application No. 17/143,104, filed on Jan. 6, 2021, now Pat. No. 11,531,664.

(51) Int. Cl.
*G06F 16/22* (2019.01)
*G06F 16/2455* (2019.01)
*G06F 16/248* (2019.01)

(52) U.S. Cl.
CPC ...... *G06F 16/2255* (2019.01); *G06F 16/2282* (2019.01); *G06F 16/248* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 10,223,395 B2 * | 3/2019 | Finis | G06F 16/2246 |
| 10,963,442 B2 * | 3/2021 | Finis | G06F 16/2246 |
| 11,010,414 B2 | 5/2021 | Bhave et al. | |
| 11,042,544 B2 | 6/2021 | Finlay et al. | |
| 11,068,493 B2 | 7/2021 | Jin et al. | |
| 11,531,664 B2 * | 12/2022 | Tabb | G06F 16/248 |
| 2016/0232189 A1 * | 8/2016 | Finis | G06F 16/2246 |

(Continued)

OTHER PUBLICATIONS

Oracle Help Center: "Database Data Warehousing Guide—7. Refreshing Materialized Views", Oct. 11, 2017 (Oct. 11, 2017).

(Continued)

*Primary Examiner* — Kim T Nguyen
(74) *Attorney, Agent, or Firm* — Honigman LLP; Brett A. Krueger

(57) ABSTRACT

A method for pre-utilizing tables before refresh includes selecting a query for execution in a data analytics application and identifying a table specified by the query, for instance a materialized table. Another operation includes computing an encoding, such as a hash value, for at least one portion of the identified table. Another operation includes comparing the computed encoding to a pre-stored encoding for the at least one portion of the identified table. On the condition that the computed encoding is identical to the pre-stored encoding, the operations include utilizing the identified table in executing the query in lieu of re-materializing the identified table. Otherwise, on the condition that the computed encoding differs from the pre-stored encoding, the operations include re-materializing the identified table before returning the results of the query.

20 Claims, 2 Drawing Sheets

(56) References Cited

U.S. PATENT DOCUMENTS

| | | |
|---|---|---|
| 2016/0275150 A1 | 9/2016 | Bournonnais et al. |
| 2019/0146961 A1* | 5/2019 | Finis .................. G06F 16/2246 |
| | | 707/743 |
| 2019/0197154 A1 | 6/2019 | Cohen et al. |
| 2019/0384762 A1 | 12/2019 | Hill et al. |
| 2020/0073953 A1 | 3/2020 | Kulkarni |
| 2020/0099614 A1 | 3/2020 | Vutharkar et al. |
| 2020/0142994 A1 | 5/2020 | Jin et al. |
| 2020/0183909 A1 | 6/2020 | Muralidhar et al. |
| 2020/0183933 A1 | 6/2020 | Finlay et al. |
| 2020/0311565 A1 | 10/2020 | Beller et al. |
| 2021/0128642 A1 | 5/2021 | Kenny et al. |
| 2021/0157779 A1 | 5/2021 | Fender et al. |
| 2021/0219213 A1 | 7/2021 | McCann et al. |
| 2021/0311936 A1 | 10/2021 | Jin et al. |
| 2022/0215009 A1* | 7/2022 | Tabb ................. G06F 16/24539 |
| 2023/0098361 A1* | 3/2023 | Tabb .................. G06F 16/2255 |
| | | 707/698 |

OTHER PUBLICATIONS

Mar. 25, 2022 Written Opinion (WO) of the International Searching Authority (ISA) and International Search Report (ISR) issued in International Application No. PCT/US2022/011197.

USPTO. Office Action relating to U.S. Appl. No. 17/143,104, dated May 10, 2022.

* cited by examiner

STAND IN TABLES

CROSS REFERENCE TO RELATED APPLICATIONS

This U.S. patent application is a continuation of, and claims priority under 35 U.S.C. § 120 from, U.S. patent application Ser. No. 17/143,104, filed on Jan. 6, 2021. The disclosure of this prior application is considered part of the disclosure of this application and is hereby incorporated by reference in its entirety.

TECHNICAL FIELD

The present disclosure relates to the field of query processing for database management, and more particularly to materialized table utilization in query processing.

BACKGROUND

The conventional database management system provides a programmatic user interface through which database queries may be received from other computing processes local or remote, and from which results to those queries may be provided to the querying computing processes. A common form of a query selects a set of records in a database for consideration, a dimension, e.g. a primary field of interest in the set of records of the database, and a measure, e.g. a value for a corresponding secondary field of interest in a result set of records. Filtering and limiting criteria also may be specified in addition to a sorting directive as to how to sort a presentation of the result set of records, and aggregate functions operating upon the returned measures amongst the set of records returned in response to the query.

Generally speaking, there are three general methods for posing queries: menu driven, querying by example and query language formulation. In the first instance, a query is formulated and issued based upon the selection of parameters in a menu. In the second instance, the information retrieval system presents a blank record and allows the end user to specify the fields and values that define the query. In the third instance, the end user formulates the query utilizing a stylized query written in a query language. The latter is the most complex method because it requires the use of a specialized language, but the latter is also the most powerful as it is the least constrained mode of querying an information retrieval system.

Executing a simple query can be computationally light and of little impact upon the resources of the underlying database management system. However, more complex queries can have significant impact upon the resources of the database management system and can require some processing lead time before a result set for the query can be provided. As such, several techniques have been proposed with the intent to reduce this lead time and the impact upon the computing resources of the database management system. One such technique is the use of the materialized table.

A materialized table is a database table that contains the results of a query. The process of establishing the materialized table is known as materialization, which is a form of caching the results of a query, similar to memorization of the value of a function in functional languages. The materialized table is to be contrasted to the concept of a view. In a database management system following the relational model, a view is a virtual table representing the result of a database query. Whenever a query or an update addresses the virtual table of a view, the database management system converts the query or update against the underlying database table or tables. A materialized table is different in that the query result is cached as a concrete, materialized table rather than a view that may be updated from the original base tables from time to time.

Consequently, since no updating to the materialized table occurs, as would have been the case with a traditional view, more efficient access to a result set for a subsequent query may be achieved so long as the content of the materialized table has not changed from the time of materialization. However, when the content of the materialized table has changed since the time of materialization, re-materialization is required and the advantage of utilizing materialized tables will have been lost. Importantly, determining whether or not the content of a materialized table has changed since materialization in of itself can be resource consumptive and can produce additional temporal delays in processing a query referencing a materialized table.

SUMMARY

Aspects of the present disclosure address deficiencies of the art in respect to the use of materialized tables in query processing and provide a novel and non-obvious method, system and computer program product for pre-utilizing materialized tables before refresh. One aspect of the disclosure provides a computer-implemented method for pre-utilizing tables before refresh that, when executed by data processing hardware, causes the data processing hardware to perform operations. One operation of the method includes selecting a query for execution in a data analytics application and identifying a table specified by the query, for instance a materialized table. Another operation includes computing an encoding, such as a hash value, for at least one portion of the identified table. Another operation includes comparing the computed encoding to a pre-stored encoding for the at least one portion of the identified table. On the condition that the computed encoding is identical to the pre-stored encoding, the operations include utilizing the identified table in executing the query in lieu of re-materializing the identified table. Otherwise, on the condition that the computed encoding differs from the pre-stored encoding, the operations include re-materializing the identified table before returning the results of the query.

This aspect of the disclosure may include one or more of the following optional features. In one aspect of the disclosure, at least one portion of the identified table is a table structure of the identified table only and wherein the identified table is re-materialized in a background process and the identified table is replaced with the re-materialized table once the re-materialization is complete. In one example, the identified table depends upon a secondary table and the computation of the encoding includes computing a hash value for both the identified table and also the secondary table. Here, the comparison includes comparing the computed hash value to a pre-stored hash value for both the identified table and the secondary table.

In another implementation, the operations further include, on condition that the computed hash value differs from the pre-stored hash value, comparing the computed hash value to a hash value just for the identified table and not for the secondary table. On condition that the computed hash value is identical to the hash value just for the identified table, the operations include utilizing the identified table while re-materializing the secondary table concurrently in a background process, but otherwise re-materializing the identified table and the secondary table before returning a result of the query.

Another aspect of the disclosure provides a data processing system adapted for pre-utilizing materialized tables before refresh. The system includes a host computing platform comprising one or more computers, each comprising memory and at least one processor and a pre-utilization module comprising computer program instructions enabled, while executing in the host computing platform, to perform operations. One operation includes selecting a query for execution in a data analytics application and identifying a table specified by the query, for instance a materialized table. Another operation includes computing an encoding, such as a hash value, for at least one portion of the identified table. Another operation includes comparing the computed encoding to a pre-stored encoding for the at least one portion of the identified table. On the condition that the computed encoding is identical to the pre-stored encoding, the operations include utilizing the identified table in executing the query in lieu of re-materializing the identified table. Otherwise, on the condition that the computed encoding differs from the pre-stored encoding, the operations include re-materializing the identified table before returning the results of the query.

This aspect of the disclosure may include one or more of the following optional features. In one aspect of the disclosure, at least one portion of the identified table is a table structure of the identified table only and wherein the identified table is re-materialized in a background process and the identified table is replaced with the re-materialized table once the re-materialization is complete. In one example, the identified table depends upon a secondary table and the computation of the encoding includes computing a hash value for both the identified table and also the secondary table. Here, the comparison includes comparing the computed hash value to a pre-stored hash value for both the identified table and the secondary table.

In another implementation, the operations further include, on condition that the computed hash value differs from the pre-stored hash value, comparing the computed hash value to a hash value just for the identified table and not for the secondary table. On condition that the computed hash value is identical to the hash value just for the identified table, the operations include utilizing the identified table while re-materializing the secondary table concurrently in a background process, but otherwise re-materializing the identified table and the secondary table before returning a result of the query.

Another aspect of the disclosure provides a computer program product for pre-utilizing materialized tables before refresh, the computer program product including a computer readable storage medium having program instructions embodied therewith, the program instructions executable by a device to cause the device to perform operations.

One operation includes selecting a query for execution in a data analytics application and identifying a table specified by the query, for instance a materialized table. Another operation includes computing an encoding, such as a hash value, for at least one portion of the identified table. Another operation includes comparing the computed encoding to a pre-stored encoding for the at least one portion of the identified table. On the condition that the computed encoding is identical to the pre-stored encoding, the operations include utilizing the identified table in executing the query in lieu of re-materializing the identified table. Otherwise, on the condition that the computed encoding differs from the pre-stored encoding, the operations include re-materializing the identified table before returning the results of the query.

This aspect of the disclosure may include one or more of the following optional features. In one aspect of the disclosure, at least one portion of the identified table is a table structure of the identified table only and wherein the identified table is re-materialized in a background process and the identified table is replaced with the re-materialized table once the re-materialization is complete. In one example, the identified table depends upon a secondary table and the computation of the encoding includes computing a hash value for both the identified table and also the secondary table. Here, the comparison includes comparing the computed hash value to a pre-stored hash value for both the identified table and the secondary table.

In another implementation, the operations further include, on condition that the computed hash value differs from the pre-stored hash value, comparing the computed hash value to a hash value just for the identified table and not for the secondary table. On condition that the computed hash value is identical to the hash value just for the identified table, the operations include utilizing the identified table while re-materializing the secondary table concurrently in a background process, but otherwise re-materializing the identified table and the secondary table before returning a result of the query.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Aspects of the disclosure provide for pre-utilizing materialized tables before refresh. In accordance with an aspect of the disclosure, as different materialized tables are created in response to respectively different data queries of a database, a hash may be generated for at least a portion of each one of the materialized tables and associated in connection with a corresponding one of the materialized tables. For instance, the portion can be a table structure for a corresponding one of the materialized tables. Thereafter, as a query that references a materialized table is received for processing, a hash may be generated for a matching portion of the referenced materialized table and compared to a stored one of the hashes for portion of a corresponding one of the materialized tables. To the extent that the hashes match, the stored materialized table may be used. Otherwise, the referenced materialized table may be re-materialized before inclusion in a result set for the query.

Figure 1:
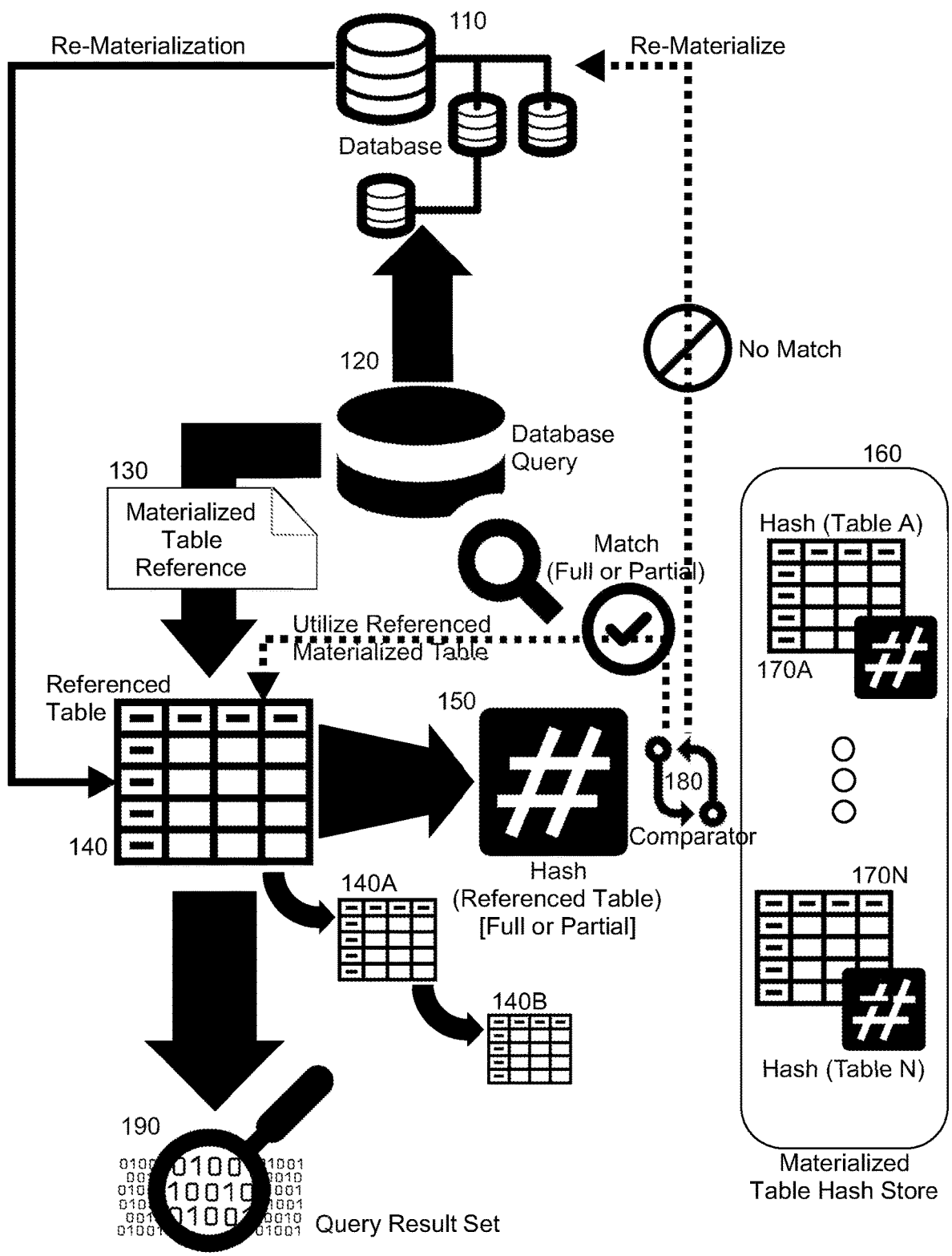
FIG. 1 is pictorial illustration of a process for pre-utilizing materialized tables before refresh.

In further illustration, FIG. 1 pictorially shows a process for pre-utilizing materialized tables before refresh. As shown in FIG. 1, a database query 120 may be issued against data in a database 110. The database query 120 includes a reference 130 to a materialized table 140. A hash value 150 is then computed in respect to a portion of the referenced materialized table 140, for instance including just a structure of the referenced materialized table 140—the column headings, the number of rows, or both—or a portion of the associated content in the referenced materialized table 140, to name two examples. A comparator 180 then compares the computed hash value 150 to a pre-stored hash values 170A, 170N stored in a set 160 of pre-stored hash values for corresponding materialized tables. To the extent that the computed hash 150 matches a corresponding one of the pre-stored hash values 170A, 170N, the referenced materialized table 140 may be incorporated into a query result set 190 for the database query 120. But, otherwise, the referenced materialized table 140 may be re-materialized for inclusion into the query results set 190.

During re-materialization, it may be determined that the structure of the referenced materialized table 140 has not changed, for instance by comparing a computed hash value 150 for the structure of the referenced materialized table 140 to a pre-stored hash value 170A, 170N of the structure of the referenced materialized table 140. In that instance, the referenced materialized table 140 may be included in the query result set 190 pending re-materialization. Then, following re-materialization, the re-materialized form of the referenced materialized table 140 may then be substituted into the query result set 190.

As well, to the extent that the referenced materialized table 140 depends upon one or more other materialized tables 140A, 140B, the computed hash value 150 may be computed for the referenced materialized table 140 and one or more of the dependent materialized tables 140A, 140B. Alternatively, the computed hash value 150 may be computed for just the structure of the referenced materialized table 140 and one or more of the dependent materialized tables 140A, 140B. In either circumstance, on the condition that the comparator 180 determines the computed hash value 150 to differ from a corresponding one of the pre-stored values 170A, 170B for the referenced materialized table 140 and the one or more dependent materialized tables 140A, 140B, a full re-materialization may be performed for the referenced materialized table 140 and the one or more dependent materialized tables 140A, 140B.

Optionally, the comparator 180 may determine that the computed hash value 150 is not equivalent to the corresponding one of the pre-stored hash values 170A, 170B. In this circumstance, the comparator 180 may then determine that a portion of the computed hash value 150 attributable only to the structure of the referenced materialized table 140 is the same as a corresponding portion of the corresponding one of the pre-stored hash values 170A, 170B. As a result, the referenced materialized table 140 may be incorporated into the query result set 190 while the referenced materialized table 140 is re-materialized. Thereafter, the re-materialized form of the referenced materialized table 140 may be substituted into the query results set 190.

Figure 2:
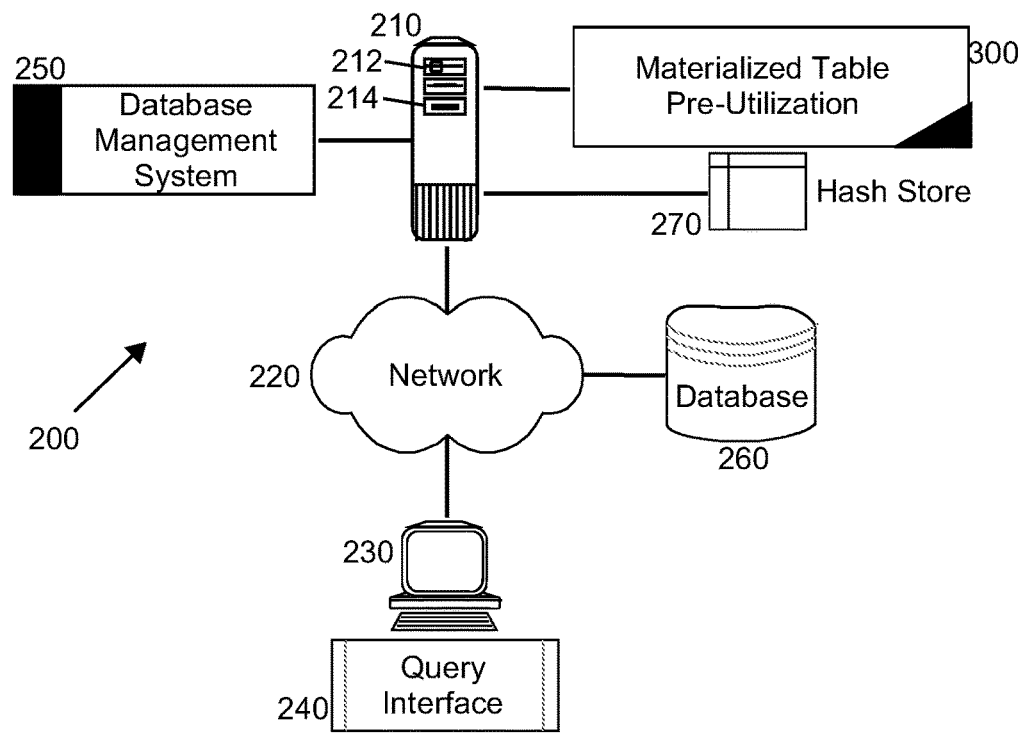
FIG. 2 is a schematic illustration of a data processing system configured for pre-utilizing materialized tables before refresh.

The process described in connection with FIG. 1 may be implemented within a data processing system 200. In further illustration, FIG. 2 schematically shows a data processing system 200 configured for pre-utilizing materialized tables before refresh. The system 200 includes a host computing system 210 that includes one or more computers, each with memory 212 and at least one processor 214. The host computing system 210 is communicatively coupled over computer communications network 220 to a database 260 accessed through database management system 250 executing in the host computing system 210. In this regard, the database management system 250 is adapted to receive database queries on data in the database 260 from different client computing devices 230 by way of a query interface 240 in each of the different client computing devices 230.

Notably, the system also includes a materialized table pre-utilization module 300. The materialized table pre-utilization module 300 includes computer program instructions enabled during execution in the memory 212 of the host computing system 210 to receive a database query and to extract therefrom, a reference to a materialized table. The program instructions are further enabled to compute a hash value for a portion of the referenced materialized table, for instance a structure of the referenced materialized table including the different column labels, and to compare the computed hash value to a pre-stored value in a hash data store 270 for the referenced materialized table. The program instructions yet further are enabled to incorporate the referenced materialized table into the materialized table so long as the hash values match, since the structure of the materialized table will not have changed irrespective of changes in the underlying data of the materialized table. Thereafter, the program instructions direct the re-materialization of the referenced materialized table for subsequent substitution into the query result set.

Figure 3:
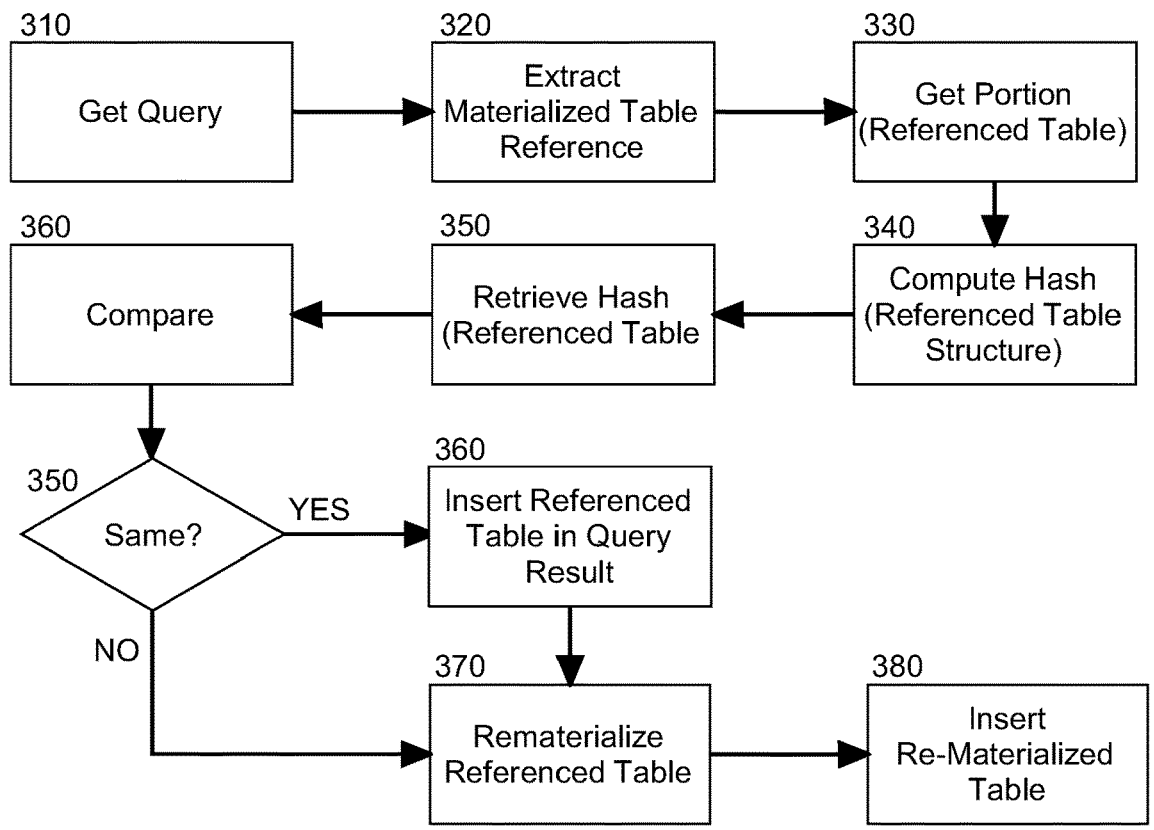
FIG. 3 is a flow chart illustrating a process for pre-utilizing materialized tables before refresh.

In even yet further illustration of the operation of the materialized table pre-utilization module 300, FIG. 3 is a flow chart illustrating a process for pre-utilizing materialized tables before refresh. Beginning in block 310, a database query is received and in block 320, a reference to a materialized table may be extracted from the query. In block 330, a portion of the referenced materialized table is determined, such as a set of column labels, or the content of the referenced table or, to the extent that the referenced materialized table depends upon a secondary materialized table, a combination of the content of both tables or the content of only the primary one of the tables. In block 340, a contemporaneous hash value is computed for the portion. In block 350, a pre-computed hash value for the referenced materialized table is retrieved from a data store of hash values and in block 360 the pre-computed hash value is compared to the contemporaneous computed hash value.

In block 370, it is determined whether or not the pre-computed hash value is identical to the contemporaneous computed hash value for the portion of the referenced materialized table so as to permit the interim utilization of the referenced materialized table concurrently with the re-materialization of the referenced materialized table. On the condition that the pre-computed hash value is not identical to the contemporaneous computed hash value, the referenced materialized table cannot be pre-utilized. In block 360, on the condition that the pre-computed hash value is identical to the contemporaneous computed hash value, the referenced materialized table can be pre-utilized in the query result to the received query. Thereafter, in block 370 the referenced table is re-materialized. Finally, in block 380 the re-materialized table is then included in the query search result.

The present disclosure may be implemented within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to aspects of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The example was chosen and described in order to best explain the principles of the disclosure and the practical application, and to enable others of ordinary skill in the art to understand the disclosure for various implementations with various modifications as are suited to the particular use contemplated.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
    obtaining a query querying a database, the query referencing a materialized table generated from the database, the referenced materialized table stored on memory hardware in communication with the data processing hardware and comprising a cached copy of data from the database;
    determining a hash value of the referenced materialized table, the hash value representing a hash of at least a portion of the referenced materialized table;
    determining that the hash value of the referenced materialized table is identical to one of a plurality of pre-stored hash values, each pre-stored hash value of the plurality of pre-stored hash values representing a hash of an associated different materialized table; and
    based on determining that the hash value of the referenced materialized table is identical to one of the plurality of pre-stored hash values, determining, using the referenced materialized table, a query result for the query.

2. The method of claim 1, wherein the operations further comprise:
    obtaining a second query querying the database, the second query referencing a referenced second materialized table of the database;
    determining a second hash value of the referenced second materialized table;
    determining that the second hash value of the referenced second materialized table is not identical to any of the plurality of pre-stored hash values;
    based on determining that the second hash value of the referenced second materialized table is not identical to any of the plurality of pre-stored hash values, re materializing the referenced second materialized table; and determining, using the re-materialized second materialized table, a second query result for the second query.

3. The method of claim 1, wherein the hash of the at least the portion of the referenced materialized table comprises a hash of column headings of the referenced materialized table.

4. The method of claim 1, wherein the hash of the at least the portion of the referenced materialized table comprises a hash of a number of rows of the referenced materialized table.

5. The method of claim 1, wherein the hash of the at least the portion of the referenced materialized table comprises a hash of column headings of the referenced materialized table and a number of rows of the referenced materialized table.

6. The method of claim 1, wherein the operations further comprise:
   determining that the referenced materialized table depends upon a second materialized table;
   determining a second hash value of the second materialized table; and
   determining that the second hash value of the second materialized table matches one of the plurality of pre-stored hash values.

7. The method of claim 1, wherein obtaining the query comprises extracting the referenced materialized table from the query.

8. The method of claim 1, wherein the hash value represents a structure of the referenced materialized table.

9. The method of claim 1, wherein the plurality of pre-stored hash values were stored prior to obtaining the query.

10. The method of claim 1, wherein determining the query result for the query comprises accessing the referenced materialized table without re-materializing the referenced materialized table.

11. A system comprising:
    data processing hardware; and
    memory hardware in communication with the data processing hardware, the memory hardware storing instructions that when executed on the data processing hardware cause the data processing hardware to perform operations comprising:
      obtaining a query querying a database, the query referencing a materialized table generated from the database, the referenced materialized table stored on the memory hardware and comprising a cached copy of data from the database;
      determining a hash value of the referenced materialized table, the hash value representing a hash of at least a portion of the referenced materialized table;
      determining that the hash value of the referenced materialized table is identical to one of a plurality of pre-stored hash values, each pre-stored hash value of the plurality of pre-stored hash values representing a hash of an associated different materialized table; and
      based on determining that the hash value of the referenced materialized table is identical to one of the plurality of pre-stored hash values, determining, using the referenced materialized table, a query result for the query.

12. The system of claim 11, wherein the operations further comprise:
    obtaining a second query querying the database, the second query referencing a referenced second materialized table of the database;
    determining a second hash value of the referenced second materialized table;
    determining that the second hash value of the referenced second materialized table is not identical to any of the plurality of pre-stored hash values;
    based on determining that the second hash value of the referenced second materialized table is not identical to any of the plurality of pre-stored hash values, re materializing the referenced second materialized table; and
    determining, using the re-materialized second materialized table, a second query result for the second query.

13. The system of claim 11, wherein the hash of the at least the portion of the referenced materialized table comprises a hash of column headings of the referenced materialized table.

14. The system of claim 11, wherein the hash of the at least the portion of the referenced materialized table comprises a hash of a number of rows of the referenced materialized table.

15. The system of claim 11, wherein the hash of the at least the portion of the referenced materialized table comprises a hash of column headings of the referenced materialized table and a number of rows of the referenced materialized table.

16. The system of claim 11, wherein the operations further comprise:
    determining that the referenced materialized table depends upon a second materialized table;
    determining a second hash value of the second materialized table; and
    determining that the second hash value of the second materialized table matches one of the plurality of pre-stored hash values.

17. The system of claim 11, wherein obtaining the query comprises extracting the referenced materialized table from the query.

18. The system of claim 11, wherein the hash value represents a structure of the referenced materialized table.

19. The system of claim 11, wherein the plurality of pre-stored hash values were stored prior to obtaining the query.

20. The system of claim 11, wherein determining the query result for the query comprises accessing the referenced materialized table without re-materializing the referenced materialized table.

* * * * *